United States Patent [19]
Wolff et al.

[11] Patent Number: 5,791,628
[45] Date of Patent: Aug. 11, 1998

[54] VALVE FOR A HYDRAULIC BRAKE SYSTEM FOR MOTOR VEHICLES

[75] Inventors: Guenter Wolff, Schwieberdingen; Juergen Zechmann, Heilbronn; Werner Brehm, Hemmingen, all of Germany

[73] Assignee: Robert Bosch GmbH, Stuttgart, Germany

[21] Appl. No.: 723,411

[22] Filed: Sep. 30, 1996

[30] Foreign Application Priority Data

Sep. 30, 1995 [DE] Germany .................. 195 36 619.0

[51] Int. Cl.$^6$ .................................................. F16K 31/12
[52] U.S. Cl. ............... 251/52; 251/129.07; 303/119.2
[58] Field of Search ................. 251/129.02, 129.15, 251/129.07, 50, 52, 53; 303/119.2, 87; 415/134

[56] References Cited

U.S. PATENT DOCUMENTS

| | | | |
|---|---|---|---|
| 3,441,246 | 4/1969 | Lauppe et al. | 251/52 |
| 5,037,269 | 8/1991 | Halberg | 415/134 |
| 5,076,538 | 12/1991 | Mohr et al. | 251/129.02 |
| 5,109,886 | 5/1992 | Takata et al. | 303/119.2 |
| 5,167,442 | 12/1992 | Alaze et al. | 303/119.2 |
| 5,375,506 | 12/1994 | Hashida et al. | 303/119.2 |

FOREIGN PATENT DOCUMENTS

| | | | |
|---|---|---|---|
| 0452173A1 | 10/1991 | France | 303/119.2 |
| 2429205 | 10/1975 | Germany | 251/129.07 |
| 3126246 | 1/1983 | Germany . | |
| 4127578A1 | 2/1993 | Germany | 303/119.2 |

*Primary Examiner*—Henry A. Bennett
*Assistant Examiner*—John Ball
*Attorney, Agent, or Firm*—Edwin E. Greigg; Ronald E. Greigg

[57] ABSTRACT

An electromagnetically actuatable valve that reduces the locking force of the valve has a seat valve, which can be transferred to a closing position counter to the force of a prestressed restoring spring. A valve seat communicates with an inflow side, and a closing member disposed on a tappet communicates on the outflow side of the valve. A magnet armature cooperates with the tappet in a valve dome which communicates with the outflow side. The magnet armature and the tappet are two separate components which positively support one another. On the inflow side, a longitudinal bore of the tappet originates at the closing member, and a first longitudinally movable pin is receive therein largely in a pressure-tight fashion. The cross section of the first pin is at least approximately equivalent to the sealing cross section of the valve seat. The longitudinal bore of the tappet is continued in the magnet armature. A second pin is received in that longitudinal bore. While the tappet and the magnet armature are pressure-equalized, in the closing position of the valve the inflow-side differential pressure is diverted, via the first and second pins nonpositively supported on one another, to an end wall of the valve dome. The valve can be used in hydraulic brake systems for motor vehicles.

5 Claims, 1 Drawing Sheet

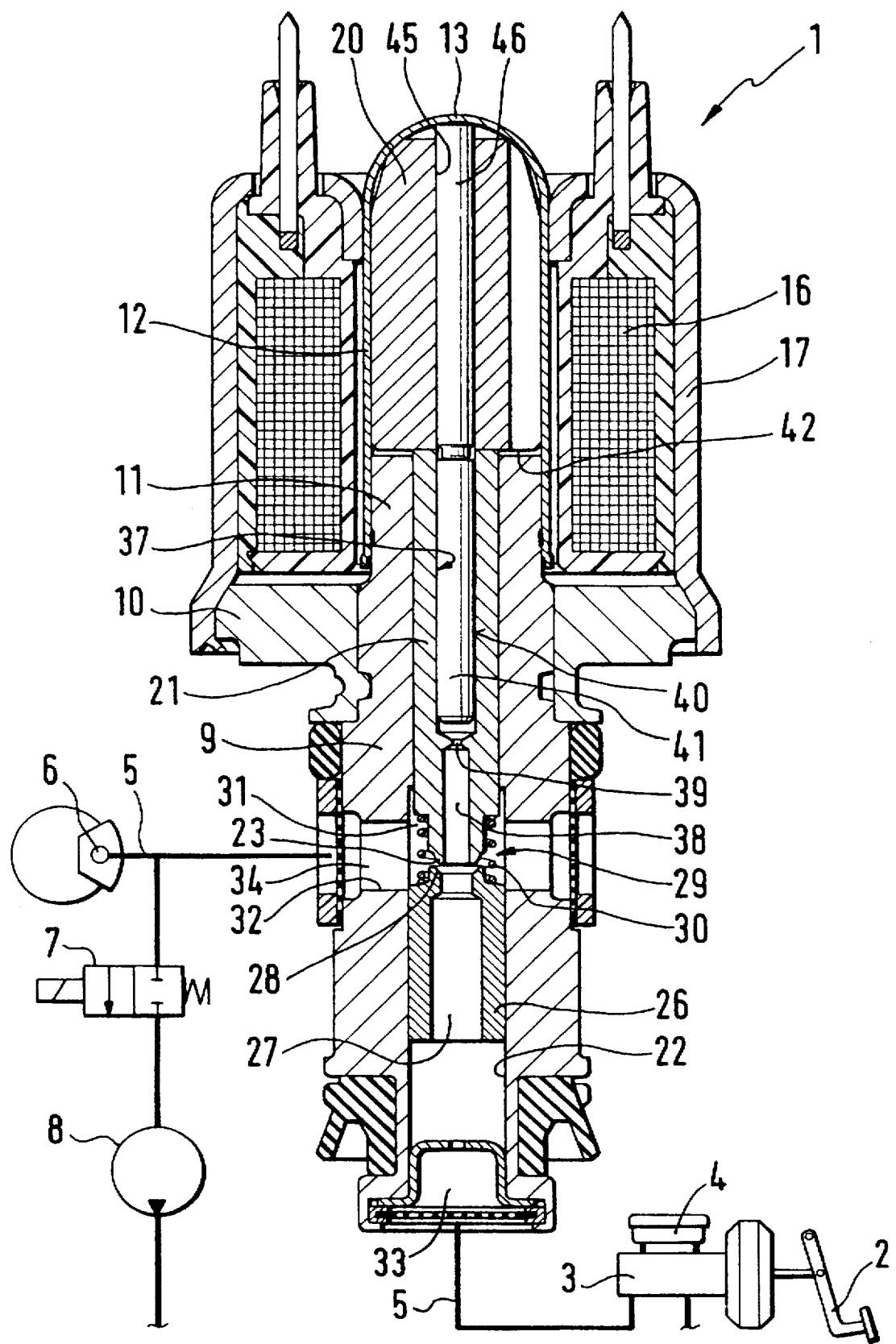

VALVE FOR A HYDRAULIC BRAKE SYSTEM FOR MOTOR VEHICLES

A BACKGROUND OF THE INVENTION

The invention is related to a valve for a hydraulic brake system for motor vehicles.

In slip controlled hydraulic brake systems, valves that are subjected to very high hydraulic opening forces in their electromagnet-actuated closing position are used. The electromagnetic circuit of these valves must therefore bring to bear a locking force or a holding-closed force that is needed to hold the magnet armature in the valve closing position which force is greater than the maximum hydraulic opening force, plus the force of a restoring spring. A magnet circuit designed in this way requires a corresponding amount of space for installation, and such valves cannot be arranged in a space-saving package. Moreover, such valves produce considerable switching noise.

German Patent Application DE 31 26 246 A1 has disclosed a valve of this generic type in which to reduce the locking force by means of a pressure equilibrium operative at the tappet, a relatively short pin, in the end portion toward the valve dome of the tappet, which is guided through the magnet armature and joined to it by positive engagement, is disposed so as to be longitudinally movable in a longitudinal bore of the tappet. In order for the tappet, which is very long in relation to its diameter, not to be weakened more than slightly, the longitudinal bore is adapted to the pin only in the end portion toward the valve dome, but otherwise is reduced to a very small diameter. This not only makes the tappet harder to manufacture; another disadvantage is the combining of the tappet and magnet armature, because as a result of production tolerances between the tappet and magnet armature, this can cause a skewed position of the armature in the valve dome that weakens the magnetic circuit.

OBJECT AND SUMMARY OF THE INVENTION

The valve of the invention has the advantage over the prior art that errors in alignment and angle of the magnet armature and tappet cannot be transferred to whichever other component is involved. It is therefore possible for the magnet armature to be guided in the valve dome with very slight radial play. In accordance with the separation of the magnet armature and tappet, the pin is divided as well, which makes the longitudinal bore in the magnet armature easier to produce. The pressure-equalizing effect is attained with high functional reliability, especially when the further features of the valve according to the invention are employed.

The provision disclosed herein increases the effectiveness of the sealing of the pin in the longitudinal bore of the tappet, since if there is a temperature increase, on the one hand the viscosity of the pressure fluid decreases but on the other the intrinsically already very small sealing gap between the pin and the tappet undergoes a reduction, because of the choice of material. Thus, the slight leakage of pressure fluid through the sealing gap remains largely unchanged of the temperature increases.

The further feature of the invention recited in claim 5 has the advantage that upon switching of the valves, the flow of pressure fluid undergoes a viscosity-independent slowing as a result of the diaphragm. This provision leads to a reduction in speed of the magnet armature and tappet during the switching operation, and the consequence is less switching noise.

The provision of claim 6 reduces switching noise as well, because the cross-sectional reduction of the tappet dictated by the longitudinal bore extends over a large portion of its length, which increases the elasticity of the tappet longitudinally. When the closing member located on the tappet meets the valve seat, not only switching noise but also wear to the seat valve parts are reduced because of reduced impact forces.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing shows a longitudinal section through an electromagnetically actuatable valve in a simplified exemplary embodiment of the invention.

DETAILED DESCRIPTION OF THE PREFERRED EMBODIMENT

In the drawing, besides an electromagnet-actuated valve 1, only a portion of a hydraulic brake system with slip control is shown. Such a brake system and its function are described in German Patent Application DE 41 19 662 A1, U.S. application Ser. No. 07/898,588 filed Jun. 15, 1992, now abandoned. The brake system includes a dual-circuit master cylinder 3, actuatable by a pedal 2, with a pressure fluid supply tank 4. At least one line 5 extends from the master cylinder 3 to at least one wheel brake cylinder 6 of a wheel brake. The valve 1 is disposed in the line in the form of a 2/2-way valve.

The valve 1 has an open position, which can be produced by spring actuation, in which quantities of pressure fluid can be displaced between the master cylinder 3 and the wheel brake cylinder 6. In its electromagnet-actuated closing position, the valve 1 splits the flow of pressure fluid between the master cylinder 3 and the wheel brake cylinder 6. An outlet valve 7 and a pump 8 are connected to the line 5 between the valve 1 and the wheel brake cylinder 6, so that pressure fluid drawn from the wheel brake cylinder in slip control can be pumped back to the master cylinder 3.

The valve 1 has a valve housing 9, which is intended for reception in a valve block, not shown, and is firmly joined to a yoke disk 10. The valve housing 9 is continued outward past the yoke disk 10 in the form of a pole core 11. A sleevelike valve dome 12 is tightly joined to a circumferential surface of the pole core 11. Remote from the pole core 11, the valve dome 12 has a hemispherical end wall 13.

The valve dome 12 is embraced by an annular magnet coil 16. A bell-shaped housing 17 encloses the magnet coil 16. The housing 17 also engages the valve dome 12 on one end, on the other end, the housing 17 is joined to a circumferential surface of the yoke disk 10.

In the valve dome 12, which is closed on the coil side, a magnet armature 20 is longitudinally movably received. A tappet 21 extends from the magnet armature 20. The magnet armature 20 and the tappet 21 are separate components. The tappet 21 is received with radial play in a longitudinal bore 22 of the valve housing 9. On its end remote from the armature, the tappet 21 is embodied as a hemispherical closing member 23.

A bushlike valve body 26 is press-fitted into the portion of the longitudinal bore 22 remote from the armature 20 and includes a through bore 27 that discharges through a valve seat 28. The valve seat 28 is embodied as a conical recess in the valve body 26. The closing member 23 and the valve seat 28 are part of a seat valve 29, which includes a prestressed restoring spring 30 braced on one end on the tappet 21 and on the other end on the valve body 26. By the action of the restoring spring 30, the tappet 21 and the magnet armature 20 engage one another nonpositively. The seat valve 29 is located in a valve chamber 31, which merges with a transverse bore 32 of the valve housing 9. A portion of the longitudinal bore 22 of the valve housing 9 remote from the armature forms the inflow side 33 of the valve 1, and communicates with the master cylinder 3. The transverse bore 32 represents the outflow side 34, which communicates with the wheel brake cylinder 6. The passage through the valve 1 between the inflow side 33 and the outflow side 34 is switched by the seat valve 29.

In the common axis of the magnet armature 20, tappet 21 and valve body 26, a longitudinal bore 37 originates at the closing member 23 and penetrates the tappet 21 over its full length. On the side toward the valve body 26, the longitudinal bore 37 initially has a bore portion 38 whose diameter is smaller than the free passageway through the valve body 26. Toward the magnet armature 20, the bore portion 38 is substantially closed with a throttle or restriction 39. After that, the longitudinal bore 37 merges with a bore portion 40 toward the armature 20, whose cross section is at least approximately equivalent to the sealing cross section of the valve seat 28. A first pin 41 is longitudinally movably received in the bore portion 40. The pin 41 extends on the one hand to near the throttle 39 and on the other to near the parting face 42 between the tappet 21 and the magnet armature 20. By means of very close tolerances and high surface quality of the bore portion 40 and the pin 41, only very slight play is achieved between the two components. The fit between the pin 41 and the bore portion 40 can therefore be considered to be low in leakage and hence largely pressure-tight. Moreover, the pin 41 is of a material with a higher coefficient of thermal expansion than that of the tappet material. Upon temperature changes, the leakage between the two parts therefore remains largely the same.

The longitudinal bore 37 of the tappet 21 is continued in a coaxially extending, continuous longitudinal bore 45 of the magnet armature 20. A second pin 46 is received in the longitudinal bore 45. As shown in the drawing, this pin is braced by one end on the end wall 13 of the valve dome 12. With its other tanglike end, it engages the pin 41 of the tappet 21 nonpositively. The fit between the second pin 46 and the longitudinal bore 45 of the magnet armature 20 can have greater play than that between the first pin 41 and the tappet 21.

The mode of operation of the valve is as follows:

In the open position of the valve 1, as shown, pressure fluid can be shifted between the master cylinder 3 and the wheel brake cylinder 6 and vice versa by actuation and release of the pedal 2. The pressure generated by the master cylinder 3 is propagated, beginning at the valve chamber 31, through the longitudinal bore 22 of the valve housing 9 into the valve dome 12. Because of this pressure-carrying connection between the outflow-side valve chamber 31 and the valve dome 12, the tappet 21 and the magnet armature 20 are pressure-equalized in this position of the valve 1. When the valve 1 is switched over to the blocking position, the magnetic force acting on the magnet armature 20, generated by supplying electric current to the magnet coil 16, therefore needs to overcome essentially only the prestressing force of the restoring spring 30, as well as forces generated by a pressure head at the tappet 21. Because of the magnetic force, the magnet armature 20 and the tappet 21 are moved toward the valve body 26. Since a hydraulic column weighs down on the face end toward the throttle of the first pin 41, the two pins 41 and 46 remain in their position as shown; that is, while the first pin 41 engages the second pin 46, the second pin is braced on the end wall 13 of the valve dome 12. The column of pressure fluid located in the bore portion 38 of the tappet 21 must partly overcome the throttle 39, in the motion of the tappet 21 toward the valve body 26, so as to fill up the space, which increases during the tappet motion, between the throttle 39 and the adjoining face end of the pin 41. The throttle 39 acts as a viscosity-independent throttle, which causes a slowing down of the closing motion and in the opposite direction of the opening motion as well of the valve 1. In conjunction with the relatively slender tappet 21, which because of the longitudinal bore 37 has a small cross section, and which increases the elasticity of the tappet in the longitudinal direction, the slowed tappet motion reduces the switching noise of the valve 1 when the closing member 23 of the tappet 21 strikes the valve seat 28 of the valve body 26.

The valve 1 is switched to its flowing position if for the sake of slip control the pressure is reduced or held constant in the wheel brake cylinder 6. Because of the higher pressure on the inflow side 33 of the valve than on the outflow side 34, a pressure difference occurs at the seat valve 29. However, this does not lead to any increase in the locking force of the valve 1. Since the cross section of the first pin 41 is at least approximately equivalent to the sealing cross section of the valve seat 28, and the fit between the pin 41 and the longitudinal bore 37 of the tappet 21 is largely pressure-tight, the differential pressure cannot be propagated through the longitudinal bore 37 to the armature-side face end of the tappet 21 and into the valve dome 12. The tappet 21 and the magnet armature 20 are therefore still subjected to the outflow-side pressure on their two face ends remote from one another and remain pressure-equalized. On the face end toward the diaphragm of the first pin 41, however, the differential pressure exerts a force aimed at the magnet armature 20. This force is, however, transmitted from the first pin 41 to the second pin 46 and from there is diverted to the end wall 13 of the valve dome 12.

When the electric current to the magnet coil 16 is turned off, the magnet force collapses. The restoring spring 30 returns the tappet 21 and the magnet armature 20 to their original position, counter to essentially frictional forces between the two pins 41 and 46 on the one hand and the tappet 21 and magnet armature 20 on the other, and counter to hydraulic forces generated at the throttle 39.

The foregoing relates to a preferred exemplary embodiment of the invention, it being understood that other variants and embodiments thereof are possible within the spirit and scope of the invention, the latter being defined by the appended claims.

What is claimed and desired to be secured: by Letters Patent of the United States is:

1. An electromagnetically actuatable valve (1) for a hydraulic brake system for motor vehicles, in particular with slip control, comprising a seat valve (29), which is transferred to a closing position counter to a force of a prestressed restoring spring (30), and whose valve seat (28) communicates with an inflow side (33) and whose closing member (23) communicates with an outflow side (34) of the valve (1), a tappet (21) includes the closing member (23), a magnet armature (20) cooperates with the tappet (21) in a valve dome (12), said valve dome carries pressure fluid which communicates with the outflow side (34) of the valve (1), a longitudinal bore (37) of the tappet (21), originates on the inflow side at the closing member (23), and is continued in the magnet armature (20) a longitudinally movable pin (41, 46), which is braced on one wall (13) of the valve dome (12), is received largely in pressure-tight fashion in said longitudinal bore, a cross section of said movable pin (41, 46) is at least approximately equivalent to a sealing cross section of the valve seat (28), the magnet armature (20) and the tappet (21) are two separate components braced nonpositively against oppositely disposed end faces, the movable pin (41, 46) is split in a region of an oppositely disposed end face (42) between the magnet armature (20) and the tappet (21) and is embodied in a first part (41) and a second part (46), the second part (46) extends in the longitudinal bore (45) of the magnet armature (20) and the first part (41) extends in the longitudinal bore (37) of the tappet (21).

2. A valve in accordance with claim 1, in which the first and second parts (41, 46) of the movable pin are braced nonpositively on one another.

3. A valve in accordance with claim 1, in which the first part (41) of the pin within the tappet (21) comprises a material with a higher coefficient of thermal expansion than that of the tappet material.

4. A valve in accordance with claim 1, in which the longitudinal bore (37) of the tappet (21), in a portion (38) toward the closing member is embodied as a throttle (39).

5. A valve in accordance with claim 6, in which the pin (41) received in the tappet (21) extends approximately as far as the throttle (39).

* * * * *